(12) United States Patent
Stiesdal

(10) Patent No.: US 8,007,624 B2
(45) Date of Patent: Aug. 30, 2011

(54) METHOD OF MANUFACTURING WIND TURBINE BLADES COMPRISING COMPOSITE MATERIALS

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 213 days.

(21) Appl. No.: 12/434,910

(22) Filed: May 4, 2009

(65) Prior Publication Data

US 2009/0272486 A1 Nov. 5, 2009

(30) Foreign Application Priority Data

May 5, 2008 (EP) ..................................... 08008453

(51) Int. Cl.
*B29C 65/00* (2006.01)
*B29C 70/00* (2006.01)
*B29C 33/00* (2006.01)
*B29C 70/36* (2006.01)

(52) U.S. Cl. ........ 156/285; 156/286; 264/314; 264/571; 416/229 R

(58) Field of Classification Search .......... 156/285–287; 264/257–258, 314, 571; 416/132 B, 232
See application file for complete search history.

(56) References Cited

U.S. PATENT DOCUMENTS

| 4,242,160 | A | 12/1980 | Pinter et al. | |
|---|---|---|---|---|
| 4,381,960 | A | 5/1983 | Pinter et al. | |
| 6,942,751 | B1 * | 9/2005 | George | 156/286 |
| 7,624,780 | B2 * | 12/2009 | Stevens | 156/382 |
| 2003/0116262 | A1 * | 6/2003 | Stiesdal et al. | 156/245 |

FOREIGN PATENT DOCUMENTS

| DE | 102005011488 A1 | 9/2006 |
|---|---|---|
| EP | 1 310 351 A1 | 5/2003 |
| NL | 7015754 A | 5/1971 |
| WO | 0220256 A1 | 3/2002 |
| WO | 2008003715 A1 | 1/2008 |

* cited by examiner

*Primary Examiner* — Kat Wyrozebski
*Assistant Examiner* — Scott W Dodds

(57) ABSTRACT

Method of manufacturing wind turbine blades having composite materials is provided that includes selecting an outer mould part, selecting an inner mould part, wherein at least a part of the surface of the inner mould part comprises a compressible layer being covered by an airtight membrane, positioning the composite materials in a mould cavity between the outer mould part and the inner mould part, evacuating the mould cavity, and bonding the composite materials, evacuating the compressible layer before positioning the composite materials.

9 Claims, 2 Drawing Sheets

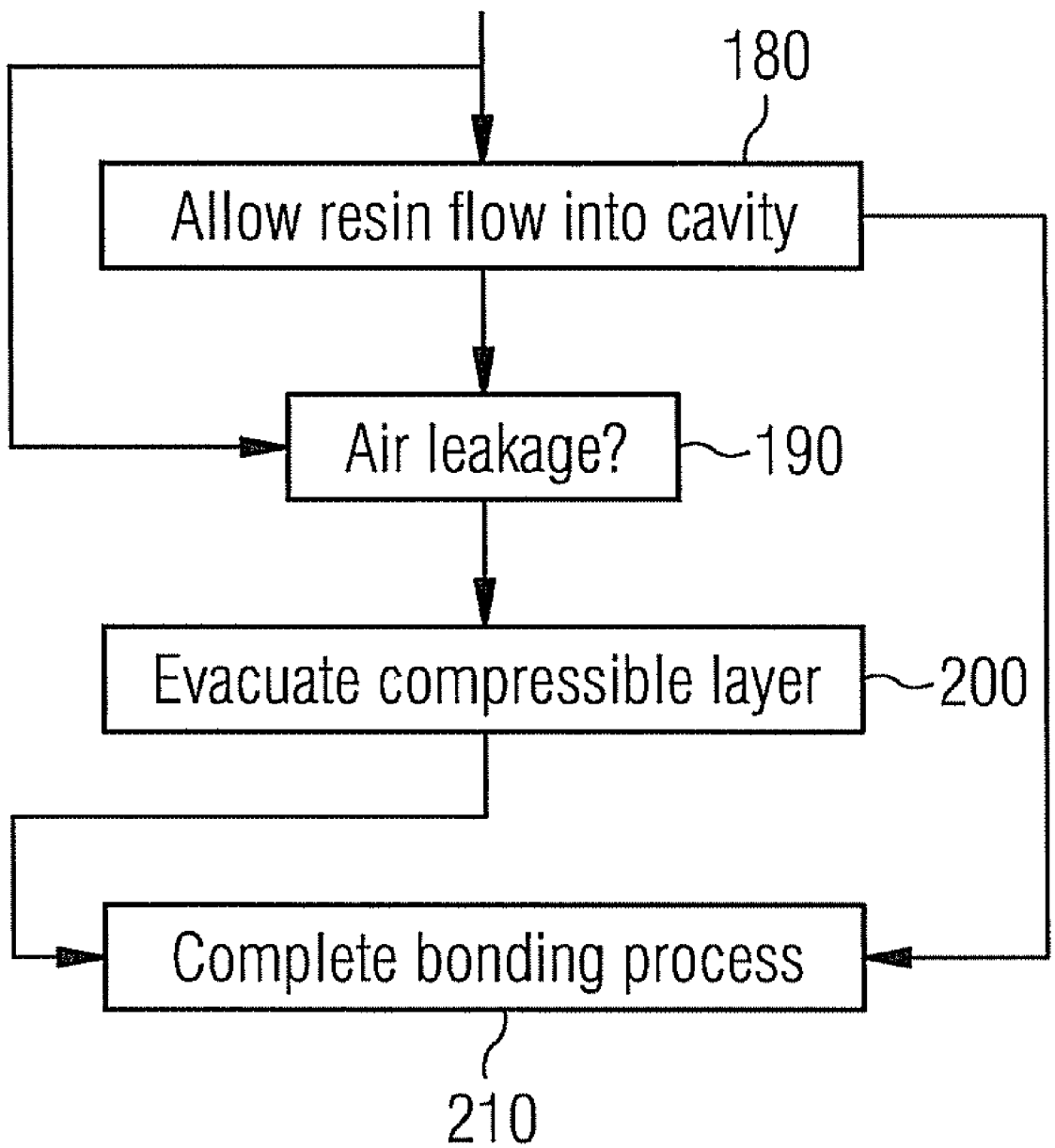

METHOD OF MANUFACTURING WIND TURBINE BLADES COMPRISING COMPOSITE MATERIALS

CROSS REFERENCE TO RELATED APPLICATIONS

This application claims priority of European Patent Office application No. 08008453.6 EP filed May 5, 2008, which is incorporated by reference herein in its entirety.

FIELD OF INVENTION

The present invention relates to a method of manufacturing wind turbine blades comprising composite materials, comprising the steps of selecting an outer mould part, selecting an inner mould part, wherein at least a part of the surface of the inner mould part comprises a compressible layer being covered by an airtight membrane, positioning the materials to be bonded in a mould cavity between the outer mould part and the inner mould part, evacuating the mould cavity, and bonding the materials.

BACKGROUND OF INVENTION

In order to manufacture rotor blades, such as windmill blades or wind turbine blades, it is known to wind roving tapes or roving bundles around a core. The systems described in patents U.S. Pat. Nos. 4,242,160 and 4,381,960 make use of this approach. In order to meet the surface quality that is desired for wind turbine applications and prevent the raw composite material surface from appearing as an external surface, an additional finishing treatment is necessary.

Another approach that allows to ensure a satisfying quality of the surfaces and bonding of the materials, and, at the same time, provides constant material characteristics throughout the blade, is vacuum-assisted resin transfer moulding. In the method proposed in patent EP 1 310 351 B1, materials are positioned in a mould cavity between an inner and an outer mould part, and, after evacuating the mould cavity, resin is allowed to flow in and to bond the materials.

SUMMARY OF INVENTION

If however, air leaks into the resin-filled cavity during the resin injection phase or during the early phase of the curing process in which the resin is still liquid, air may be enclosed in the laminate and consequently diminish the strength of the blade. Such air leakage typically occurs when an air-tight membrane covering the inner mould part has small holes or disruptions.

In order to ensure the integrity of the air-tight membrane, so that air cannot leak into the mould cavity kept under vacuum, membranes have been used that consist of a number of different layers. Thus, redundancy is added to the membrane and defects in air tightness in one of the layers does not compromise overall air tightness of the membrane.

However, using such multi-layer membranes result in higher material consumption and higher overall technical effort.

It is thus an object of present invention to provide a method of manufacturing wind turbine blades comprising composite materials that provides constant material characteristics throughout the blade while avoiding the use of multi-layer air-tight membranes.

This object is achieved by a method.

A method of manufacturing wind turbine blades comprising composite materials, comprising the steps of
selecting an outer mould part,
selecting an inner mould part, wherein at least a part of the surface of the inner mould part comprises a compressible layer being covered by an airtight membrane,
positioning materials to be bonded in a mould cavity between the outer mould part and the inner mould part,
evacuating the mould cavity,
bonding the materials,
characterized in that it further comprises the step of
evacuating the compressible layer before positioning the materials to be bonded.

By evacuating the compressible layer before positioning the materials to be bonded, the compressible layer is compressed by the air pressure external to the compressible layer, and thus is of reduced overall size. When, after having positioned the materials to be bonded in the mould cavity between the outer moulds and the inner mould in its compressed state, air is also evacuated from the mould cavity, the compressible layer expands again and presses against the materials.

Since in that state both the compressible layer and the mould cavity are under vacuum, there is no significant difference of air pressure that might lead to air leaking through the air-tight membrane and thus compromise the strength of the blade. Consequently, the use of a multi-layer air-tight membrane is avoided while blade material quality is ensured.

Thus, the present invention allows to reliably manufacture wind turbine blades of a defined material quality while saving technical effort and material consumption.

The invention can be embodied as defined in the dependent claims.

Embodiments of the method may comprise the step of detecting a leak in the airtight membrane.

This enables to further increase the pressure applied to the materials to be bonded by letting air flow into the compressible layer after positioning the materials to be bonded in the mould cavity and while evacuating the mould cavity. Thus, not only the force of expansion of the compressible layer, but also the air pressure within the compressible layer provides pressure to the materials.

This is particularly useful is such embodiments where the compressible layer is evacuated again on the condition of a leak being present, so that the effects of the present invention may be specifically achieved when a leak actually occurs, while profiting from the additional pressure when there is no air leakage.

In embodiments, detecting a leak can be performed based on detecting an air pressure within the mould cavity, and/or can be performed based on detecting an air pressure within the compressible layer. Alternatively, air inflow/outflow rates can be measured, e.g., by measuring the amount of air flowing into the compressible layer and/or by measuring the amount of air flowing out of the mould cavity.

In embodiments, the compressible layer can be evacuated again after the materials have bonded. This facilitates removing the inner mould core from the manufacture wind turbine blade.

BRIEF DESCRIPTION OF THE DRAWINGS

The present invention is further explained referring to a detailed example and a number of figures, as described below:
FIG. 3 shows a schematic flow-diagram of a second part of the embodiment of the method (continuing FIG. 2).

DETAILED DESCRIPTION OF INVENTION

Figure 1:
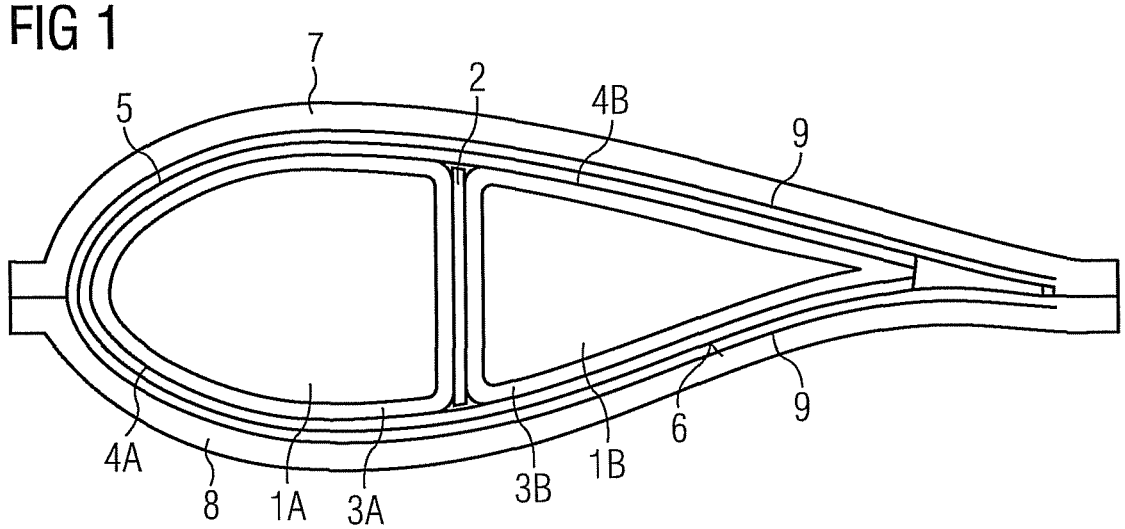
FIG. 1 shows a schematic cross-section of an apparatus for carrying out an embodiment of the method.

FIG. 1 shows a schematic cross-section of a mould for carrying out the method as proposed herein.

In this embodiment, the inner mould is provided as two separate pieces. The first inner mould comprises a rigid inner core 1A which is covered by a layer of compressible material 3A. The first inner mould further comprises an airtight membrane 4A which is located on top of the outer surface of the compressible layer 3A.

Likewise, the second inner mould comprises a rigid inner core 1B which is covered by a layer of compressible material 3B. The second inner mould also further comprises an airtight membrane 4B which is located on top of the outer surface of the compressible layer 3B. Between the first and the second inner mould, a shear web 2 is located.

In the mould cavity between the airtight membrane 4A, 4B and the inner surface 6 of the outer mould (that is, of top outer mould 7 as well as bottom outer mould 8) materials to be bonded 5 (composite materials, lay-up materials) are located. Such lay-up materials may comprise glass fibre materials, carbon fibre materials, balsa wood, and PVC foam.

In both top outer mould 7 and bottom outer mould 8, a temperature regulating system 9 may be located, comprising temperature sensors and heating elements.

Airtight membranes 4A and 4B may be implemented as individual vacuum bags which are dimensioned such that they fit over the inner mould including its compressible layer 1A, 3A or 1B, 3B, respectively. Thus, when compressing the compressible layer, excess vacuum bag material will form small reservoirs in the form of small folds. During the bonding process, these reservoirs make sure that bag material is not extruded out into small voids of the laminate, that is, the materials to be bonded, but can expand into such voids without extrusion. This provides additional safety against bag bursting.

As can be seen from the figure, the inner mould is in its entirety dimensioned such that it fits the shaping of the outer mould 7, 8 when lay-up materials are in position and the compressible layer 3A, 3B is in its compressed state. Consequently, the inner mould would exceed the size of the cavity provided by the inner mould with positioned lay-up materials when its compressible layer is uncompressed. In other words, the layer of compressible material is dimensioned such that in its compressed state, it takes up the shape and size that the inner mould should have to be suited for laying up the fibres to be included in the bonded materials, i.e., the laminate. Practically, the inner mould may have a shape that is similar to the cavity that will be within the manufactured wind turbine blade. Consequently, when in its uncompressed state, the inner mould is larger than the cavity that will be within the manufactured wind turbine blade, and the compressible material exerts a consolidation pressure on the laminate.

Figure 2:
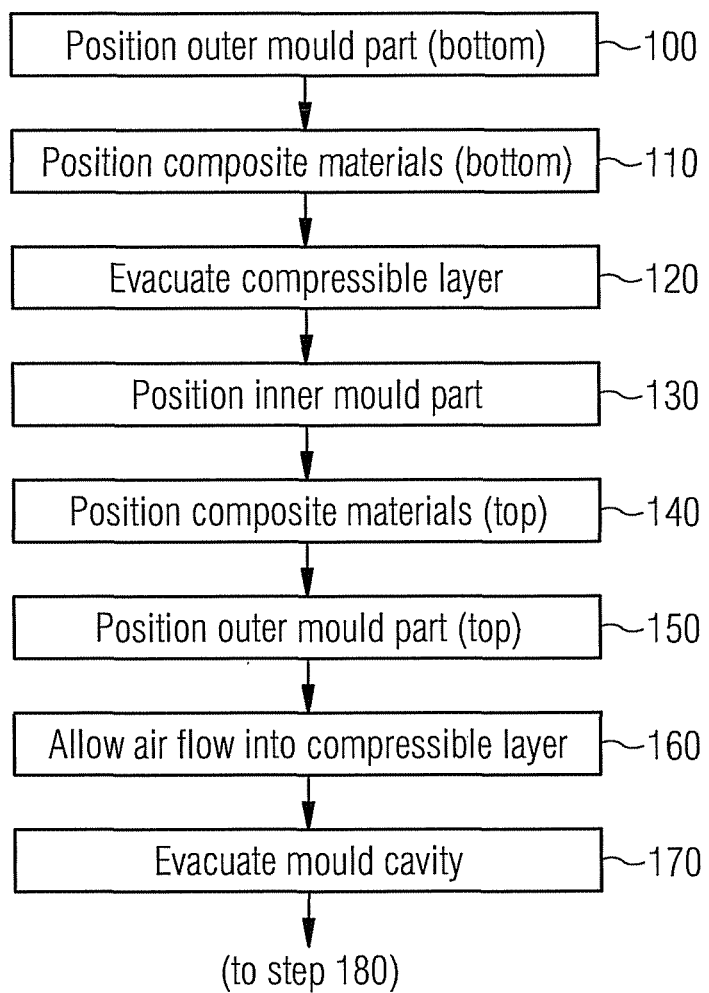
FIG. 2 shows a schematic flow-diagram of a first part of an embodiment of the method.

The process of moulding using the configuration shown in FIG. 1 is explained further with reference to FIGS. 2 and 3.

FIG. 2 shows a schematic flow-diagram of a first part of an embodiment of the method. In step 100, bottom outer mould part 8 is brought into position for positioning the lay-up materials. These are positioned in step 110 by locating them layer by layer on top of the inner surface 6 of outer mould 8.

Then, in step 120, the compressible layer 3A, 3B is evacuated, so that the air pressure of the surrounding atmosphere compresses the layer and the inner mould shrinks and takes up its shape to fit in the seat provided by the bottom mould and the positioned lay-up materials.

In the embodiment shown in FIG. 1, the shear web 2 is positioned as well between the first and the second inner core. If a shear web is not to be included, a single inner mould may be used instead of one. Alternatively, two complementary inner moulds may be used in order to facilitate handling of the inner mould.

When the inner mould has been positioned in the seat provided by the bottom mould and the positioned lay-up materials in step 130, more lay-up materials are positioned in a likewise manner on top of the inner mould in step 140.

Then, in step 150, the top outer mould is put on the inner mould, so that the outer mould is closed, and the configuration as shown in FIG. 1 is established.

Now, in step 160, air is allowed to flow in the compressible layer, so that the atmospheric pressure is allowed to support the compression of the lay-up materials located in the mould cavity. In alternative embodiments, the compressible layer may remain under vacuum so that an air leakage is prevented, since there is no sufficient difference of air pressure to let air pass through possible holes in the membrane. In such embodiments, a detection of air leakage is dispensable.

In both cases, the mould cavity is evacuated in step 170, and the force of expansion of the compressible layer, as well as the air pressure acting within the compressible layer in the present embodiment, compress the composite materials (lay-up materials) in the mould cavity, so that the lay-up materials are forced against the outer mould.

The further steps of the process are described with regard to FIG. 3. In step 180, resin is allowed to flow into the cavity in which the lay-up materials are located. Additionally or alternatively, heat may be applied to perform the bonding process.

While doing so, the system detects if air leaks from the compressible layer into the mould cavity in step 190. This can be done by any suitable leak detection method, e.g., by measuring the air pressure in the mould cavity, or by measuring the amount of air flowing into the compressible layer or out of the mould cavity. However, in the most simple case, leak detection can be performed by just listening if there is any noise or whistle from leaking air.

If air leakage takes place, the compressible layer is evacuated again in step 200, so that any air flow between the compressible layer and the mould cavity is quickly eliminated. Because of the force of expansion of the compressible layer, the pressure acting on the materials to be bonded is maintained, albeit possibly with reduced strength. In order to achieve this effect, the compressible layer may comprise, or consist of, a suitable foam rubber or any other foamed compressible material. The compressible material could also be a kind of a mat with an outer and an inner side or shell separated by a layer in the middle consisting of thin ribs which are bending when it is provided with a load and stretching out again when the load is releaved. It could also consist of springs placed between the core and the outer shell as the bags lies up against.

The bonding process can then be completed (step 210), as soon as the resin has set. Before opening the mould, air is allowed into the space between outer and inner mould, so that the mould parts can be taken apart. In order to facilitate removing the wind turbine blade thus manufactured, the compressible layer may be evacuated again to reduce the size of the inner mould.

Thus, the proposed method serves to manufacture wind turbine blades of high quality, and at the same time, improves stability of the manufacturing process and reduces material consumption. In the proposed method, the bonding process can be continued even in the event of holes occurring in the air-tight membrane without compromising the material properties of the manufactured blades, and the costly use of multilayer air-tight membranes, or other membranes having been particularly secured against air leaks, is avoided.

The invention claimed is:

1. A method of manufacturing a wind turbine blade comprising composite materials, comprising:
   selecting an outer mould part;
   selecting an inner mould part, wherein at least a substantial part of the surface of the inner mould part comprises a compressible layer being covered by an airtight membrane;
   evacuating the compressible layer, thus causing the compressible layer to become compressed;
   positioning, after the evacuating, materials to be bonded in a mould cavity between the outer mould part and the inner mould part;
   wherein after positioning, the outer mould part encloses the inner mold part;
   evacuating the mould cavity; and
   bonding the materials;
   wherein the inner mould part is selected such that a force of expansion of the compressible layer provides sufficient pressure for the bonding;
   and wherein the inner mould part is selected such that it exceeds the hollow space provided by the outer mould part when the compressible layer is not compressed.

2. The method according to claim 1, further comprising:
   detecting a leak in the airtight membrane.

3. The method according to claim 2, wherein the detecting the leak is based on detecting an air pressure within the mould cavity.

4. The method according to claim 2, wherein the detecting the leak is based on detecting an air pressure within the compressible layer and/or measuring an amount of air flowing into the compressible layer and/or measuring an amount of air flowing out of the mould cavity.

5. The method according to claim 2, when a leak being present the method further comprising:
   re-evacuating the compressible layer.

6. The method according to claim 1, wherein air is allowed to flow into the compressible layer while evacuating the mould cavity.

7. The method according to claim 6, further comprising:
   re-evacuating the compressible layer occurs after the materials have bonded.

8. The method according to claim 1, wherein the inner mould part is selected to comprise a rigid core part with a compressible coating being covered by a vacuum bag.

9. The method according to claim 8, wherein the vacuum bag is dimensioned to fit over the rigid core part with its compressible coating in an uncompressed state.

* * * * *